Nov. 22, 1932.  G. V. FEARN  1,888,821
FERTILIZER SOWING MACHINE
Filed Aug. 10, 1931  2 Sheets-Sheet 2
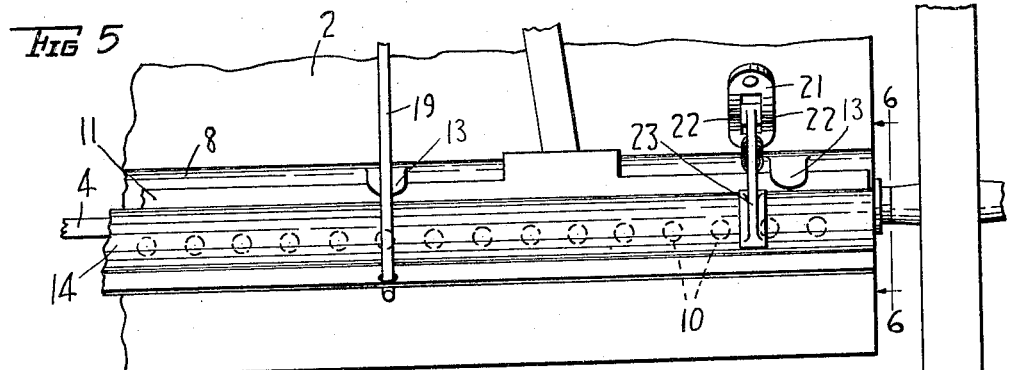
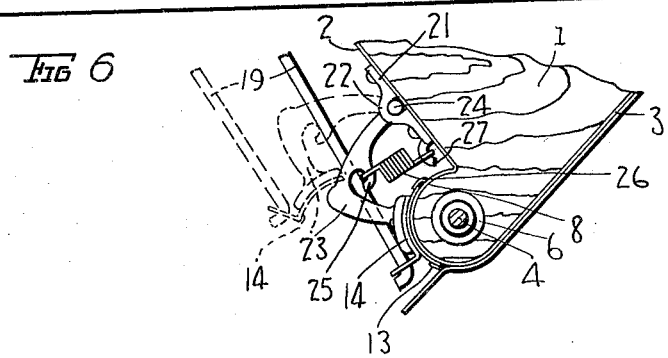
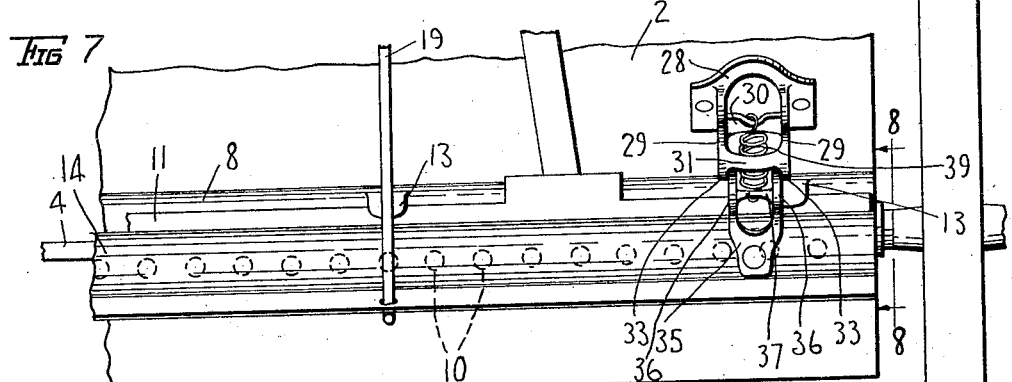
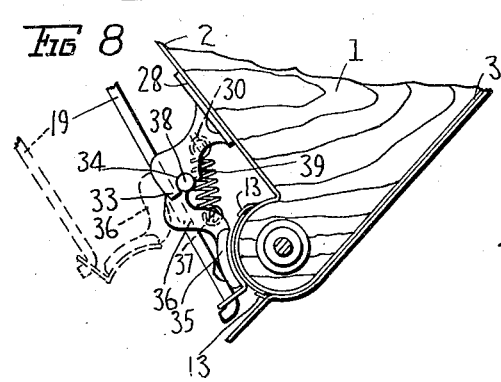
INVENTOR
Guy V. Fearn
BY Staley & Welch
ATTORNEYS Patented Nov. 22, 1932

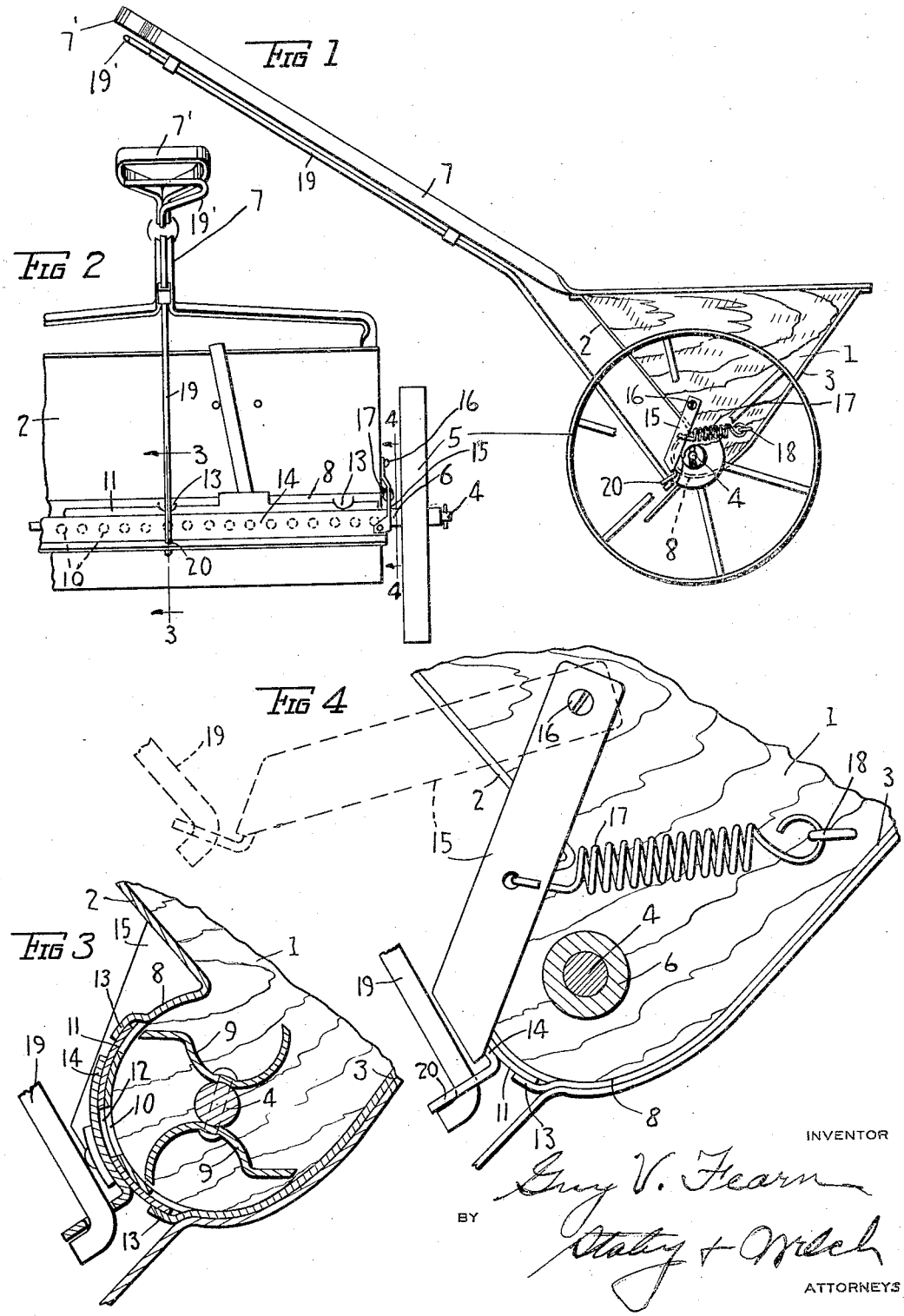

1,888,821

UNITED STATES PATENT OFFICE

GUY V. FEARN, OF FREDERICKTOWN, OHIO

FERTILIZER-SOWING MACHINE

Application filed August 10, 1931. Serial No. 556,139.

This invention relates to machines for distributing fertilizer, it more particularly relating to means for cutting off and on the flow of fertilizer from the distributing device at the will of the operator.

The object of my invention is to provide simple and effective means by which the operator of a fertilizer sower may cut off or on the flow of the fertilizer while the machine is being pushed over the ground.

A more specific object of the invention is to provide manually-operated means for a shutter or valve to control the flow of the fertilizer which may be operated from the handle grip of the machine.

In the accompanying drawings:

Fig. 1 is a side elevation of a machine embodying my improvements.

Fig. 2 is a front elevation of a portion of the machine.

Fig. 3 is an enlarged section on the line 3—3 of Fig. 2.

Fig. 4 is an enlarged section on the line 4—4 of Fig. 2.

Fig. 5 is a front elevation of a portion of the machine showing a modification of the spring device for holding the shutter closed.

Fig. 6 is an enlarged section on the line 6—6 of Fig. 5.

Fig. 7 is a front elevation of a portion of the machine showing another form of spring device for holding the shutter in both open and closed position.

Fig. 8 is an enlarged section on the line 8—8 of Fig. 7.

The machine to which my improvements are applied is similar to the one shown in my pending application filed April 27th, 1931, Serial No. 533,073, and employs a hopper-shaped receptacle consisting of end walls 1 and sloping rear and front walls 2 and 3 respectively, the receptacle being mounted upon an axle 4 supported by carrying wheels 5, the axle being mounted in bearings 6 located in the ends of the receptacle and having one of the wheels connected therewith to impart rotation thereto when the machine is operated. The handle bar 7 is connected with the upper edge of the hopper and projects rearwardly and upwardly therefrom by which the machine may be pushed over the ground. At the lower portion of the hopper is formed a semi-cylindrical chamber 8 located beyond and to the rear of the hopper and parallel thereto, this chamber being in communication with the hopper so that the material carried in the hopper will flow by gravity thereto. Secured to that part of the axle which extends through the chamber are a plurality of radially disposed blades 9 constructed in the manner explained in my pending application which acts to force the fertilizer through the series of openings 10 in the rear wall of the chamber. A curved strip 11 is employed to regulate the size of these openings, this strip having orifices 12 equal in size and number to the openings 10 and being mounted in slidable relation with the outer rear surface of the wall of the chamber by clips 13 which are struck from the metal of the chamber wall.

In the operation of machines of this kind it is desirable to cut off and on the feed of the material to the feed openings at the will of the operator so that when the machine is being transported at the point of operation or when it is being moved over walks or other places where it is not desired to sow the fertilizer, the operator may readily cut off the flow of the fertilizer and as readily cut on the flow thereof when desired. To that end there is provided a valve or shutter 14 of a contour to conform to the shape of the outer surface of the valve 11, which shutter in the form shown in Figs. 1 to 4 inclusive is provided at each end with an arm 15 rigidly connected therewith, which arm has its free end pivotally mounted on a stud 16 which projects from the end of the hopper. Each arm has connected therewith one end of a coil spring 17, the outer end of the spring being connected with a suitable hook 18 on the hopper end. These springs act to hold the shutter normally in closed position and in order to open the shutter when desired there is provided a rod 19, the lower end of which is bent so as to be hooked into an eye 20 which projects from the shutter and the other end of which extends to a point in proximity to the handle grip 7' of the handle 7, being bent to form a gripping portion 19' which lies parallel with the handle grip so that the operator may readily operate the rod 19 with his fingers while grasping the handle grip. By pulling upwardly on the rod 19, the shutter is caused to open so that fertilizer may be fed through the openings 10 while, when the rod is released the shutter automatically closes. The arrangement of the grips is such that the operator may grasp both the handle grip and the operating rod grip simultaneously and conveniently hold the shutter open while the machine is sowing fertilizer.

In Figs. 5 and 6 there is shown a modification in the manner of holding the shutter closed. In this case there is secured to the rear side 2 of the hopper a plate 21 which is formed with a pair of integral bearings 22 open on their rear sides, with an open space therebetween. Secured to the shutter is a bent arm 23, the free end of which is insertable in the open space between the bearings 2 and has a pair of trunnions 24 adapted to be received in the bearings. This arm has integrally connected therewith a hook 25 to receive one end of a coil spring 26, the other end of the spring being looped over a hook 27 which is integrally formed with the lower end of the plate 21. When the shutter 14 is opened by the rod 19 it swings upon the bearings 21 as a pivot and causes an elongation of the spring 26 which serves to automatically close it when the operator releases the rod 19.

In Figs. 7 and 8 there is shown a further modification in which means are provided for not only automatically closing the shutter but for automatically holding it in open position after it has been opened by the manipulation of the rod 19. In this case there is secured near each end of the rear side wall 2 of the hopper a plate 28 which has formed integrally therewith a pair of laterally-projecting arms 29 which are connected by a pair of cross members 30 and 31 and also has downwardly depending portions 33 each of which has an open bearing 34. There is secured to each end of the shutter 14 a plate 35 which has a pair of bent arms 36 connected by a cross member 37 and having their free ends provided with trunnions 38 adapted to be received in the bearings 34 and held therein by a coil spring 39, one end of which is connected with the cross members 30 and the other to the cross member 37. The arrangement and disposition of the parts is such that when the shutter is closed the cross member 37 is on one side of the center of the trunnion 38, while when the shutter is opened the cross bar 37 will be swung to the opposite side of the center of the trunnions so that the spring will hold the shutter open as well as closed.

Having thus described my invention, I claim:

1. In a fertilizer-sowing machine, a hopper having a discharge opening, means for forcing the fertilizing material therethrough, a shutter for closing said opening, manually-operated means for opening said shutter, and a spring for closing said shutter.

2. In a fertilizer-sowing machine, a hopper having a discharge opening, means for forcing the fertilizing material therethrough, a shutter for closing said opening, a rod connected with said shutter and extending to the rear of said machine for manually opening said shutter, and a spring for closing said shutter.

3. In a fertilizer-sowing machine, a hopper having a discharge opening, means for forcing the fertilizing material therethrough, a shutter for closing said opening, a spring for holding said shutter in either open or closed position, and manually-operated means for opening or closing said shutter.

4. In a fertilizer-sowing machine, a hopper, supporting wheels therefor, a handle extending rearwardly from said hopper having a hand grip, said hopper having a discharge opening at its lower end, a pivoted shutter for closing said opening, a rod connected with said shutter and extending rearwardly and provided with a handle grip arranged in proximity to and parallel with the handle grip of said handle to permit the operator to open said shutter and hold the same in open position while manipulating the machine, and a spring for closing said shutter.

5. In a fertilizer-sowing machine, a hopper, supporting wheels therefor, a handle extending rearwardly from said hopper having a hand grip, said hopper having a discharge opening at its lower end, a pivoted shutter for closing said opening, a rod connected with said shutter and extending rearwardly and provided with a handle grip arranged in proximity to and parallel with the handle grip of said handle to permit the operator to open said shutter, and a spring for holding said shutter in either open or closed position.

6. In a machine for sowing fertilizer, a hopper having a partially cylindrical chamber at its lower end in communication therewith, said chamber having a discharge opening in its rear wall, a feeding device in said chamber, a valve for regulating the size of said discharge opening, a pivoted shutter for closing said opening, manually-operated means for opening said shutter and a spring for holding said shutter in closed position.

7. In a machine for sowing fertilizer, a hopper having a partially cylindrical chamber at its lower end in communication therewith, said chamber having a discharge opening in its rear wall, a feeding device in said chamber, a valve for regulating the size of said discharge opening, a pivoted shutter for closing said opening, and a spring for holding said shutter in either open or closed position.

8. In a fertilizer-sowing machine, a hopper having a discharge opening, means for forcing the fertilizing material therethrough, a shutter for closing said opening, a rod connected with said shutter and extending to the rear of said machine whereby the operator can manually open said shutter and hold the same in open position, and a spring for automatically closing the shutter when said rod is released by the operator.

In testimony whereof, I have hereunto set my hand this 25th day of July 1931.

GUY V. FEARN.